United States Patent
Blanchard et al.

(10) Patent No.: US 9,187,655 B2
(45) Date of Patent: Nov. 17, 2015

(54) FILM-FORMING COMPOSITION INCLUDING AN AGENT CAPABLE OF TRAPPING FORMALDEHYDE

(75) Inventors: Benjamin Blanchard, Taverny (FR); Katarzyna Chuda, Paris (FR)

(73) Assignee: SAINT-GOBAIN ADFORS, Chambery (FR)

( * ) Notice: Subject to any disclaimer, the term of this patent is extended or adjusted under 35 U.S.C. 154(b) by 0 days.

(21) Appl. No.: 13/505,802

(22) PCT Filed: Nov. 3, 2010

(86) PCT No.: PCT/FR2010/052352
§ 371 (c)(1),
(2), (4) Date: Jun. 13, 2012

(87) PCT Pub. No.: WO2011/055073
PCT Pub. Date: May 12, 2011

(65) Prior Publication Data
US 2012/0245267 A1  Sep. 27, 2012

(30) Foreign Application Priority Data
Nov. 3, 2009 (FR) ..................... 09 05272

(51) Int. Cl.
*C08K 5/17* (2006.01)
*C09D 7/12* (2006.01)
*C08K 5/00* (2006.01)
*C08K 5/07* (2006.01)
*C08K 5/315* (2006.01)

(52) U.S. Cl.
CPC .......... *C09D 7/1233* (2013.01); *C08K 5/0008* (2013.01); *C08K 5/07* (2013.01); *C08K 5/315* (2013.01)

(58) Field of Classification Search
CPC ........ C09D 7/1233; C08K 5/07; C08K 5/315; C08K 5/0008
USPC .......................................... 524/218
See application file for complete search history.

(56) References Cited

U.S. PATENT DOCUMENTS

| 4,789,707 | A  | * | 12/1988 | Nishimura et al. | 525/157 |
|---|---|---|---|---|---|
| 5,068,279 | A  | * | 11/1991 | Morse | 524/593 |
| 5,112,652 | A  | * | 5/1992 | Greene | 427/342 |
| 5,599,884 | A  | * | 2/1997 | Beleck | 525/509 |
| 5,969,046 | A  |   | 10/1999 | Schindler et al. | |
| 6,123,739 | A  | * | 9/2000 | Andrews et al. | 8/181 |
| 6,217,603 | B1 | * | 4/2001 | Clark et al. | 606/214 |
| 2005/0075429 | A1 | * | 4/2005 | Harashina et al. | 524/196 |
| 2007/0191256 | A1 | * | 8/2007 | Fossum et al. | 510/515 |
| 2011/0300359 | A1 |   | 12/2011 | Blanchard et al. | |
| 2012/0132851 | A1 |   | 5/2012 | Blanchard et al. | |

FOREIGN PATENT DOCUMENTS

| EP | 0617973 | * | 3/1994 | ............ A61L 25/00 |
|---|---|---|---|---|
| EP | 0647658 | * | 9/1994 | ............ C08F 6/14 |
| FR | 1 483 515 | A | 6/1967 | |
| JP | 2000-144016 | A | 5/2000 | |
| JP | 2001-89217 | A | 4/2001 | |
| WO | WO 95/26378 | * | 10/1995 | ............ C08J 7/14 |

OTHER PUBLICATIONS

U.S. Appl. No. 13/375,992, filed Jan. 13, 2012, Blanchard, et al.
U.S. Appl. No. 13/141,018, filed Aug. 25, 2011, Blanchard, et al.
International Search Report issued Mar. 25, 2011 in PCT/FR2010/052352.

* cited by examiner

*Primary Examiner* — John Uselding
(74) *Attorney, Agent, or Firm* — Oblon, McClelland, Maier & Neustadt, L.L.P.

(57) ABSTRACT

The present invention relates to a film-forming composition intended to be applied to an inner surface of a building which includes an agent capable of trapping formaldehyde chosen from compounds comprising active methylene(s), tannins and amides.
Another subject matter of the present invention is the use of said film-forming composition in reducing the amount of formaldehyde in the air inside a building.

13 Claims, No Drawings

FILM-FORMING COMPOSITION INCLUDING AN AGENT CAPABLE OF TRAPPING FORMALDEHYDE

CROSS REFERENCE TO RELATED APPLICATIONS

The present application is a 35 U.S.C. §371 national stage patent application of International patent application PCT/FR2010/052352, filed on Nov. 3, 2010, published as WO 2011/055073 on May 12, 2011, the text of which is incorporated by reference, and claims the benefit of the filing date of French Application No. 0905272, filed on Nov. 3, 2009, the text of which is also incorporated by reference.

The invention relates to a film-forming composition intended to be applied to an inner surface of a building which includes an agent capable of trapping formaldehyde.

Highly varied materials are used for the interior construction and interior fitting out of dwellings and offices. Some of these materials, such as sound and/or thermal insulators, wooden panels, furniture and decorative parts, use adhesives, paints and varnishes which employ formaldehyde.

The proportion of free formaldehyde in these materials is already very low. Nevertheless, regulations regarding protection against undesirable emissions of products which may exhibit a risk to the health of the individual are becoming stricter and require a further reduction in the amount of free formaldehyde or formaldehyde capable of being emitted by materials over time.

Means for reducing the amount of formaldehyde inside buildings are known.

The proposal has been made to include particles of photocatalytic titanium oxide in a paint (CN-A-1912037, CN-C-1290948 and CN-C-1303168) or a material made of plaster (US-A-2005/0226761), a paper or a textile, plastic or wooden material (EP-A-1 437 397).

It is also known to use a hydrazide in a construction material based on plaster or on cement (US-A-2004/0101695 and JP-A-2004115340) or in a paint (JP-A-2000095980).

The proposal has also been made to add calcined oyster shell powder to a paint or a paper, in particular a wallpaper (JP-A-2005230729).

Also known are water-based paints which comprise, as agent capable of reducing the amount of formaldehyde, an amino acid or a salt of this acid, a peptide or a sulfite (CN-A-101016426).

The aim of the present invention is to reduce the amount of formaldehyde present inside buildings.

To achieve this aim, the present invention provides a film-forming composition which comprises an agent capable of trapping formaldehyde.

The term "film-forming composition" is understood to mean a composition capable of forming a film by departure of the dispersing medium initially present in said composition. The film obtained adheres to the substrate on which the film-forming composition has been applied.

In particular, the film-forming composition according to the invention is a paint or a varnish.

The term "agent capable of reacting with formaldehyde" is understood to mean an organic compound which bonds to formaldehyde via a covalent bond.

The agent capable of reacting with formaldehyde in accordance with the invention is chosen from:
1—compounds comprising active methylene(s), preferably corresponding to the following formulae:

FORMULA (I)

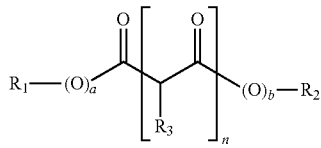

in which:

$R_1$ and $R_2$, which are identical or different, represent a hydrogen atom, a $C_1$-$C_{20}$, preferably $C_1$-$C_6$, alkyl radical, an amino radical or a radical of formula

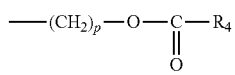

in which $R_4$ represents a

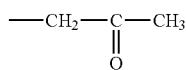

radical or

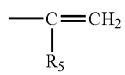

radical, where $R_5$=H or —$CH_3$, and p is an integer varying from 1 to 6, $R_3$ represents a hydrogen atom, a $C_1$-$C_{10}$ alkyl radical, a phenyl radical or a halogen atom, a is equal to 0 or 1, b is equal to 0 or 1, n is equal to 1 or 2.

The preferred compounds of formula (I) are:

2,4-pentanedione:
  $R_1$=—$CH_3$; $R_2$=—$CH_3$; $R_3$=H; a=0; b=0; n=1
2,4-hexanedione:
  $R_1$=—$CH_2$—$CH_3$; $R_2$=—$CH_3$; $R_3$=H; a=0; b=0; n=1
3,5-heptanedione:
  $R_1$=—$CH_2$—$CH_3$; $R_2$=—$CH_2$—$CH_3$; $R_3$=H; a=0; b=0; n=1
2,4-octanedione:
  $R_1$=—$CH_3$; $R_2$=—($CH_2$)$_3$—$CH_3$; $R_3$=H; a=0; b=0; n=1
acetoacetamide:
  $R_1$=—$CH_3$; $R_2$=—$NH_2$; $R_3$=H; a=0; b=0; n=1
acetoacetic acid:
  $R_1$=—$CH_3$; $R_2$=H; $R_3$=H; a=0; b=1; n=1
methyl acetoacetate:
  $R_1$=—$CH_3$; $R_2$=—$CH_3$; $R_3$=H; a=0; b=1; n=1
ethyl acetoacetate:
  $R_1$=—$CH_3$; $R_2$=—$CH_2$—$CH_3$; $R_3$=H; a=0; b=1; n=1
n-propyl acetoacetate:
  $R_1$=—$CH_3$; $R_2$=—($CH_2$)$_2$—$CH_3$; $R_3$=H; a=0; b=1; n=1
isopropyl acetoacetate:
  $R_1$=—$CH_3$; $R_2$=—$CH(CH_3)_2$; $R_3$=H; a=0; b=1; n=1
isobutyl acetoacetate:

$R_1$=—CH$_3$; $R_2$=—CH$_2$—CH(CH$_3$)$_2$; $R_3$=H; a=0; b=1; n=1
t-butyl acetoacetate:
  $R_1$=—CH$_3$; $R_2$=—C(CH$_3$)$_3$; $R_3$=H; a=0; b=1; n=1
n-hexyl acetoacetate:
  $R_1$=—CH$_3$; $R_2$=—(CH$_2$)$_5$—CH$_3$; $R_3$=H; a=0; b=1; n=1
malonamide:
  $R_1$=—NH$_2$; $R_2$=—H$_2$; $R_3$=H; a=0; b=0; n=1
malonic acid:
  $R_1$=H; $R_2$=H; $R_3$=H; a=1; b=1; n=1
dimethyl malonate: $R_1$=—CH$_3$; $R_2$=—CH$_3$; $R_3$=H; a=1; b=1; n=1
diethyl malonate:
  $R_1$=—CH$_2$—CH$_3$; $R_2$=—CH$_2$—CH$_3$; $R_3$=H; a=1; b=1; n=1
di(n-propyl)malonate:
  $R_1$=—(CH$_2$)$_2$—CH$_3$; $R_2$=—(CH$_2$)$_2$—CH$_3$; $R_3$=H; a=1; b=1; n=1
diisopropyl malonate:
  $R_1$=—CH (CH$_3$)$_2$; $R_2$=—CH (CH$_3$)$_2$; $R_3$=H; a=1; b=1; n=1
di(n-butyl)malonate:
  $R_1$=—(CH$_2$)$_3$—CH$_3$; $R_2$=—(CH$_2$)$_3$—CH$_3$; $R_3$=H; a=1; b=1; n=1
acetonedicarboxylic acid:
  $R_1$=H; $R_2$=H; $R_3$=H; a=1; b=1; n=2
dimethyl acetonedicarboxylate:
  $R_1$=—CH$_3$; $R_2$=—CH$_3$; $R_3$=H; a=1; b=1; n=2
1,4-butanediol diacetate:
  $R_1$=—CH$_3$; $R_2$=—(CH$_2$)$_4$—O—CO—CH$_2$—CO—CH$_3$; $R_3$=H; a=0; b=1; n=1
1,6-hexanediol diacetate:
  $R_1$=—CH$_3$; $R_2$=—(CH$_2$)$_6$—O—CO—CH$_2$—CO—CH$_3$; $R_3$=H; a=0; b=1; n=
methacryloyloxyethyl acetoacetate:
  $R_1$=—CH$_3$; $R_2$=—(CH$_2$)$_2$—O—CO—C(CH$_3$)=CH$_2$; $R_3$=H; a=0; b=1; n=1

FORMULA (II)

$$R_6\text{—CHR}_7\text{—C}\equiv\text{N} \quad (II)$$

in which:
$R_6$ represents a cyano radical or a

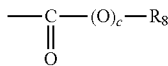

radical
in which:
$R_8$ represents a hydrogen atom, a $C_1$-$C_{20}$, preferably $C_1$-$C_6$, alkyl radical or an amino radical
c is equal to 0 or 1
$R_7$ represents a hydrogen atom, a $C_1$-$C_{10}$ alkyl radical, a phenyl radical or a halogen atom.
The preferred compounds of formula (II) are:
methyl 2-cyanoacetate:
  $R_6$=—CO—O—CH$_3$; $R_7$=H
ethyl 2-cyanoacetate:
  $R_6$=—CO—O—CH$_2$—CH$_3$; $R_7$=H
n-propyl 2-cyanoacetate:
  $R_6$=—CO—O—(CH$_2$)$_2$—CH$_3$; $R_7$=H
isopropyl 2-cyanoacetate:
  $R_6$=—CO—O—CH(CH$_3$)$_2$; $R_7$=H
n-butyl 2-cyanoacetate:
  $R_6$=—CO—O—(CH$_2$)$_3$CH$_3$; $R_7$=H
isobutyl 2-cyanoacetate:
  $R_6$=—CO—O—CH$_2$—CH(CH$_3$)$_2$; $R_7$=H
tert-butyl 2-cyanoacetate:
  $R_6$=—CO—O—C(CH$_3$)$_3$; $R_7$=H
2-cyanoacetamide:
  $R_6$=—CO—NH$_2$; $R_5$=H
propanedinitrile:
  $R_6$=—C≡N; $R_5$=H

FORMULA (III)

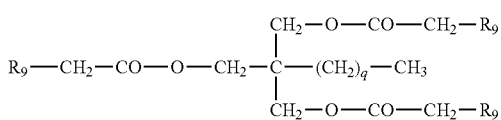

in which:
$R_9$ represents a —C≡N or —CO—CH$_3$ radical
q is an integer varying from 1 to 4.
The preferred compounds of formula (III) are:
trimethylolpropane triacetoacetate:
  $R_9$=—CO—CH$_3$; q=1
trimethylolpropane tricyanoacetate:
  $R_9$=—C≡N; q=1

FORMULA (IV)

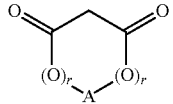

in which:
A represents a —(CH$_2$)$_3$— or —C(CH$_3$)$_2$— radical
r is equal to 0 or 1.
The preferred compounds of formula (IV) are:
1,3-cyclohexanedione:
  A=—(CH$_2$)$_3$—; r=0
Meldrum's acid:
  A=—C(CH$_3$)$_2$—; r=1.
2—tannins, in particular condensed tannins, such as mimosa, quebracho, pine, pecan nut, hemlock wood and sumac tannins.
3—amides, for example urea, 1,3-dimethylurea, ethyleneurea and its derivatives, such as N-hydroxyethyleneurea, N-aminoethylethyleneurea, N-(3-allyloxy-2-hydroxypropyl)aminoethylethyleneurea, N-acryloxyethylethyleneurea, N-methacryloxyethylethyleneurea, N-acrylaminoethylethyleneurea, N-methacrylaminoethylethyleneurea, N-methacryloyloxyacetoxyethyleneurea, N-methacryloyloxyacetaminoethylethyleneurea and N-di(3-allyloxy-2-hydroxypropyl)aminoethylethyleneurea, diurea, biuret, triuret, acrylamide, methacrylamide, polyacrylamides and polymethacrylamides, The amount of agent capable of trapping formaldehyde to be used can vary to a large extent according to the type of film-forming composition used and the use desired. In general, the agent capable of trapping formaldehyde represents from 0.05 to 35% by weight of the dry matter of the film-forming composition, preferably from 1 to 20% and better still from 4 to 10%.

The agent capable of reacting with formaldehyde can also be chosen from the following hydrazides, provided that its content represents at least 4% by weight of the dry matter of the film-forming composition, preferably from 6 to 30% and advantageously from 10 to 20%:

a) monohydrazides of formula $R_1CONHNH_2$ in which $R_1$ represents an alkyl radical, for example a methyl, ethyl, n-propyl, isopropyl, n-butyl, sec-butyl or tert-butyl radical, or an aryl radical, for example a phenyl, biphenyl or naphthyl radical, it being understood that a hydrogen atom of said alkyl or aryl radicals can be replaced by a hydroxyl group or a halogen atom and said aryl radical can be substituted by an alkyl radical, for example a methyl, ethyl or n-propyl radical, b) dihydrazides of formula $H_2NHN-X-NHNH_2$ in which X represents a —CO— or —CO—Y—CO— radical, and Y is an alkylene radical, for example a methylene, ethylene or trimethylene radical, or an arylene radical, for example a phenylene, biphenylene or naphthylene radical, it being understood that a hydrogen atom of said alkylene or arylene radicals can be replaced by a hydroxyl group or a halogen atom and said aryl radical can be substituted by an alkyl radical, for example a methyl, ethyl or n-propyl radical. Mention may be made, by way of examples, of oxalic acid dihydrazide, malonic acid dihydrazide, succinic acid dihydrazide, adipic acid dihydrazide, sebacic acid dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide and carbohydrazide, c) polyhydrazides, such as trihydrazides, in particular citric acid trihydrazide, pyromellitic acid trihydrazide, 1,2,4-benzenetrihydrazide, nitrilo-triacetic acid trihydrazide and cyclohexane-tricarboxylic acid trihydrazide, tetrahydrazides, in particular ethylenediaminetetraacetic acid tetrahydrazide or 1,4,5,8-naphthoic acid tetrahydrazide, and polyhydrazides formed from a hydrazide monomer comprising a polymerizable group, for example a poly(acrylic acid hydrazide) or a poly(methacrylic acid hydrazide).

The film-forming composition in accordance with the invention is a fluid composition which is liquid or which has a slightly pasty consistency and which can be spread as a thin layer over a material to form, after drying (curing), an adherent and resistant thin coating (film) having a protective and/or decorative role. The film-forming composition can be used in particular as a primer or a paint.

Generally, the film-forming composition comprises a dispersing medium, a binder, pigments, fillers and additives.

The dispersing medium acts as inert dispersant or solvent for the abovementioned constituents and in addition makes it possible to adjust the viscosity and the rheology of the film-forming composition in order to provide easy application to the material to be coated.

The dispersing medium can be water or an organic solvent.

The water generally represents from 30 to 95% of the total weight of the film-forming composition.

The organic solvent can be chosen from hydrocarbons, for example white spirit, turpentine, monochlorobenzene and 1,2-dichlorobenzene, alcohols, for example ethyl alcohol, isopropyl alcohol, n-butyl alcohol and 2-ethylhexyl alcohol, glycol ethers, for example butyl glycol, alkyl diglycols, butyl glycol acetate and propylene glycol ethers, esters, for example ethyl acetate, isopropyl acetate, amyl acetate and butyl glycol acetate, and ketones, for example methyl ethyl ketone, methyl butyl ketone, methyl isobutyl ketone, isophorone and diacetone alcohol.

The dispersing medium can also be composed of a mixture of water and of a small proportion of at least one of the abovementioned organic solvents, the role of which is to increase the solubilization of the binder and which thus acts as cosolvent. The proportion of cosolvent generally represents at most 5% of the total weight of the film-forming composition.

The binder provides the connection between all the constituents and makes it possible for the film-forming composition to adhere to the material on which it is applied.

The binder (also known as "resin") can be of natural origin, for example a drying oil (ester of glycerol and of fatty acid(s)) or a natural gum or resin (dammar, copal, shellac or rosin), or of synthetic origin, for example a rubber derivative (cyclized or chlorinated rubber), a cellulose derivative (nitrocellulose, cellulose acetate, cellulose propionate or cellulose acetate butyrate), a vinyl resin (polyvinyl acetate, vinylchloride copolymer or vinylpropionate copolymer), an alkyd resin (ester of polyalcohol and of phthalic acid(s)), an acrylic resin (polymethyl or polyethyl(meth)acrylate), a saturated or unsaturated polyester, a polyepoxide (obtained by reaction of epichlorohydrin and bisphenol A and/or F), an aminoplast (urea/formaldehyde or melamine/formaldehyde resin), a phenolic (phenol/formaldehyde) resin, a polyurethane resin (single- or two-component) or a silicone-modified resin.

The proportion of binder generally represents from 5 to 65% by weight of the dry matter of the film-forming composition.

The pigments confer opacity and color on the film-forming composition and contribute in addition to improving the physical properties of the film, in particular its hardness, its impermeability or its corrosion resistance. The pigments are pulverulent solids with a very fine particle size (generally of less than 1 μm) which are insoluble in the dispersing medium.

The pigments can be inorganic, for example metal, semimetal and/or alkali metal (titanium, zinc, chromium, antimony, nickel, lead, potassium or molybdenum) oxides and metal sulfides, in particular zinc and/or cadmium sulfides.

The pigments can also be organic, for example azo derivatives, phthalocyanine, anthraquinone, perylene or thioindigo derivatives, isoindoline or isoindolinone pigments, quinacridone, dioxazine or diketopyrrolo-pyrrole-based pigments, and carbon black.

The pigments can also be effect pigments, for example aluminum pigments for the preparation of "metallized" paints, or pearlescent agents, in particular based on micas coated with inorganic layers (titanium dioxide or iron oxide) or organic layers (phthalocyanine).

The fillers contribute to improving the mechanical, chemical and rheological properties. These are pulverulent solids with a particle size greater than that of the pigments (greater than 1 μm) which are essentially inorganic, which are white in color, which are insoluble in the dispersing medium and which exhibit little or no hiding power.

The fillers are, for example, calcium carbonate, calcium sulfate, barium sulfate, kaolin, talc, calcium silicate and silicas (quartz, amorphous silica and diatomaceous earths).

The pigments and the fillers constitute the solid charge of the film-forming composition. The amount of pigments and fillers generally represents from 10 to 95% by weight of the dry matter of the film-forming composition, preferably from 35 to 95% by weight of the dry matter.

The additives are auxiliary products present in the film-forming composition in a low amount, generally from 0.3 to 5% by weight of the dry matter of the film-forming composition, preferably from 1 to 3%.

These additives are, for example, rheological agents which help in the application of the film-forming composition with a significant thickness and provide stability on storage (bentonite, hydrogenated castor oil, polyamide resin); dispersing agents and wetting agents for the pigments and fillers (soybean lecithin, polyacrylate, silicones); bubble breaking agents (polyacrylate, silicones); antiskinning agents (oximes, for example methyl ethyl ketoxime and cyclohexane oximes); spreading agents (glycol ethers and esters, silicone oils, fluorinated derivatives); flatting agents (silicates, silica, polyethylene waxes); plasticizers (chlorinated or nonchlorinated hydrocarbons, polyvinyl ethers); lubricants (calcium stearate and polyols); catalysts (dibutyltin dilaurate) and driers (lead naphthenate, cobalt naphthenate, lead octanoate or cobalt octanoate); preservatives (biocides); scratch inhibitors; soil repellants; flame retardants; UV stabilizers; moisture absorbents and antifoaming agents.

As indicated above, the film-forming composition is preferably a paint or a varnish, advantageously a water-based paint.

The film-forming composition in accordance with the invention can be easily prepared by the means known to a person skilled in the art, for example by incorporating the agent capable of trapping formaldehyde during the preparation of the film-forming composition, in conjunction with the binder, the pigments, the fillers and/or the additives, or more simply by adding said agent to a conventional film-forming composition. The latter method of preparation is preferred. In this case, the addition of the agent capable of trapping formaldehyde preferably takes place with stirring, so as to obtain a homogeneous mixture.

The film-forming composition according to the invention is applied to the desired substrate under the same conditions as a conventional film-forming composition not comprising an agent capable of trapping formaldehyde, for example by coating, casting, spraying, dipping or immersing techniques.

The material on which the film-forming composition according to the invention can be applied depends essentially on the nature of the dispersing medium (water or organic solvent). Mention may be made of wood, plaster, concrete, cement, metal or wall coverings, in particular webs and painter's canvases based on glass fibers. Particularly advantageously, the film-forming composition is a water-based paint which is applied to a material, in particular a painter's canvas composed of glass fibers, which already includes an agent capable of trapping formaldehyde, which makes it possible to further lower the level of formaldehyde inside buildings.

The examples which follow make it possible to illustrate the invention without, however, limiting it.

EXAMPLE 1

40 g of acetoacetamide are added to a container containing 1000 g of a film-forming composition kept stirred.

The film-forming composition is an acrylic paint comprising water, a binder, pigments and adjuvants (Reference Evolutex®, sold by Sigma Coating; solids content: 58%).

The film-forming composition thus obtained is applied to a painter's canvas using a roller and is left to dry. The painted canvas includes 217.5 g/m² of paint and 14 g/m² of acetoacetamide.

This canvas is subjected to tests of absorption and of desorption of formaldehyde under the following conditions.

A sample of the painted canvas is placed in a device in accordance with the standard ISO 16000-9, modified in that the relative humidity level is equal to 50% in the test chamber containing the sample to be analyzed and in the reference chamber not containing any sample of the painted canvas.

a) in a first step, the test chamber and the reference chamber are continuously fed for 4 days with a stream of air comprising approximately 140 µg/m³ of formaldehyde. The amount of formaldehyde in the air exiting from the test and reference chambers is measured after different periods of time and the percentage of formaldehyde adsorbed by the painted canvas is calculated.

b) in a second step, the test chamber and the reference chamber are fed for 48 hours with air not comprising formaldehyde and the amount of formaldehyde present in the air at the outlet of said chambers is measured after different periods of time.

The formaldehyde is measured by liquid chromatography (HPLC) under the conditions of the standard ISO 16000-3.

The results are given in the following table 1 (the percentage of formaldehyde adsorbed is shown in brackets).

TABLE 1

|  | Example 1 | Reference |
| --- | --- | --- |
| a) formaldehyde adsorbed (µg/m³) | | |
| after 8 h | 68 (48%) | 130 |
| after 48 h | 60 (50%) | 120 |
| after 72 h | 64 (51%) | 130 |
| after 96 h | 79 (44%) | 140 |
| b) formaldehyde emitted (µg/m³) | | |
| after 24 h | 10 | 16 |
| after 48 h | 11 | 13 |

It is found that the painted canvas of example 1 according to the invention makes it possible to trap a significant part of the formaldehyde present in the air (approximately 50% over the duration of the test). The proportion of formaldehyde trapped is constant throughout the duration of the test.

The level of emission of the formaldehyde from the painted canvas of example 1 in stage b) is similar to that of the reference.

EXAMPLE 2

The procedure is carried out under the conditions of example 1, modified in that the film-forming composition is applied to a painter's canvas comprising 5 g/m² of acetoacetamide. The painted canvas includes 217.5 g/m² of paint and 19 g/m² of acetoacetamide.

The results are given in the following table 2 (the percentage of formaldehyde adsorbed is shown in brackets).

TABLE 2

|  | Example 2 | Reference |
| --- | --- | --- |
| a) formaldehyde adsorbed (µg/m³) | | |
| after 8 h | 23 (72%) | 81 |
| after 48 h | 17 (80%) | 85 |
| after 72 h | 24 (70%) | 79 |
| after 96 h | 24 (75%) | 97 |
| b) formaldehyde emitted (µg/m³) | | |
| after 24 h | <5 | <5 |
| after 48 h | <5 | 5 |

The part of the formaldehyde trapped in example 2 is higher (approximately 75% over the duration of the test) than in example 1 (approximately 50%). The proportion of formaldehyde trapped does not vary by much during stage a).

The level of emission of the formaldehyde from the painted canvas of example 2 in stage b) is similar to that of the reference.

What is claimed is:

1. A paint comprising 30 to 95% by weight of water and, by weight percent of the dry matter of the paint:
   from 5 to 65% of an acrylic binder;
   from 10 to 95% of a pigment and an inorganic filler;
   from 0.3 to 5% of an additive; and
   from 4 to 10% of an agent capable of trapping formaldehyde,
   wherein the agent is at least one selected from the group consisting of a tannin and a compound comprising an active methylene of formula (I):

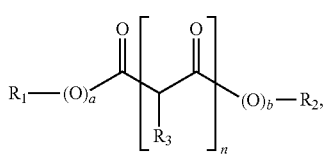

wherein:
$R_1$ is a hydrogen atom, a $C_1$-$C_{20}$ alkyl radical, or an amino radical,
$R_2$ is a hydrogen atom or an amino radical,
$R_3$ is a hydrogen atom, a $C_1$-$C_{10}$ alkyl radical, a phenyl radical, or a halogen atom;
a is equal to 0 or 1;
b is equal to 0 or 1; and
n is equal to 1 or 2.

2. The paint of claim 1, comprising at least one agent of formula (I) selected from the group consisting of acetoacetamide, malonamide, malonic acid, and acetonedicarboxylic acid.

3. The paint of claim 1, wherein the tannin is a mimosa, quebracho, pine, pecan nut, hemlock wood, or sumac tannin.

4. A process for reducing an amount of formaldehyde in the air inside a building, the process comprising:
   applying the paint of claim 1 to an inner surface of a building.

5. The process of claim 4, wherein the paint is applied to a painter's canvas comprising glass fibers.

6. The process of claim 5, wherein the painter's canvas comprises a second agent capable of trapping formaldehyde.

7. The paint of claim 1, wherein the total content of the pigment and the inorganic filler is from 35 to 95% by weight based on the dry matter of the paint.

8. The paint of claim 1, wherein the content of the additive is from 1 to 3% by weight based on the dry matter of the paint.

9. The paint of claim 1, wherein the pigment is a pulverulent solid having a particle size of less than 1 μm that is insoluble in water.

10. The paint of claim 1, wherein the pigment is at least one inorganic pigment selected from the group consisting of a metal, a semimetal, an alkali metal oxide, and a metal sulfide.

11. The paint of claim 1, wherein the pigment is an organic pigment selected from the groups consisting of an azo, phthalocyanine, anthraquinone, a perylene, a thioindigo, an isoindoline, an isoindolinone, a quinacridone, a dioxazine, a diketopyrrolo-pyrrole, and carbon black.

12. The paint of claim 9, wherein the filler is a pulverulent solid having a particle size greater than 1 μm that is insoluble in water.

13. The paint of claim 12, wherein the filler is calcium carbonate, calcium sulfate, barium sulfate, kaolin, talc, calcium silicate, or a silica.

* * * * *